United States Patent
Krijn et al.

(10) Patent No.: US 12,490,721 B2
(45) Date of Patent: Dec. 9, 2025

(54) SYSTEM AND METHOD FOR PROTECTING FISH FROM PARASITE INFECTION

(71) Applicant: SIGNIFY HOLDING B.V., Eindhoven (NL)

(72) Inventors: Marcellinus Petrus Carolus Michael Krijn, Eindhoven (NL); Lambertus Adrianus Marinus De Jong, Son (NL); Massimo Tumolo, Utrecht (NL); Sri Andari Husen, Eindhoven (NL); Lambertus Antonius Johannes Van De Wijdeven, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 68 days.

(21) Appl. No.: 18/274,234

(22) PCT Filed: Jan. 21, 2022

(86) PCT No.: PCT/EP2022/051391
§ 371 (c)(1),
(2) Date: Jul. 26, 2023

(87) PCT Pub. No.: WO2022/161876
PCT Pub. Date: Aug. 4, 2022

(65) Prior Publication Data
US 2024/0081297 A1 Mar. 14, 2024

(30) Foreign Application Priority Data
Jan. 28, 2021 (EP) .................................... 21154028

(51) Int. Cl.
*A01K 61/13* (2017.01)

(52) U.S. Cl.
CPC .................................... *A01K 61/13* (2017.01)

(58) Field of Classification Search
CPC ....................................................... A01K 61/13
See application file for complete search history.

(56) References Cited

U.S. PATENT DOCUMENTS

| 6,203,170 B1 * | 3/2001 | Patrick | A01K 79/02 362/249.06 |
| 12,011,128 B2 * | 6/2024 | Hwang | A61L 2/24 |

(Continued)

FOREIGN PATENT DOCUMENTS

| WO | 2018011745 A1 | 1/2018 |
| WO | 2018099504 A1 | 6/2018 |
| WO | 20170445 A1 | 9/2018 |

OTHER PUBLICATIONS

AKVA Aurora SubLED Combi, Technology for Sustainable Biology, https://www.akvagroup.com/pen-based-aquaculture/lights/akva-aurora-subled-combi, 4 pgs. (2020).

(Continued)

*Primary Examiner* — William L Gmoser

(57) ABSTRACT

A system is disclosed for protecting fish from parasite infection. The system comprises a fish guidance system for deterring fish from moving into a first region bordering a water surface and/or for can move from the second region into the first region so that they can reach the water surface bordering the first region. The system further comprises a radiation disinfection system that is configured to provide disinfection radiation to the first region, the disinfection radiation being configured to disinfect water from parasites.

14 Claims, 5 Drawing Sheets

(56) References Cited

U.S. PATENT DOCUMENTS

| | | | |
|---|---|---|---|
| 2007/0231189 A1 | 10/2007 | Jung et al. | |
| 2016/0000051 A1* | 1/2016 | Goodrick | A01K 61/90 119/844 |
| 2019/0320624 A1 | 10/2019 | Becker | |
| 2020/0337274 A1* | 10/2020 | Howe | A01K 61/13 |
| 2021/0250512 A1* | 8/2021 | James | A01K 29/00 |
| 2021/0251196 A1* | 8/2021 | Lowenthal | A61K 39/12 |
| 2021/0329891 A1* | 10/2021 | Kozachenok | A01K 61/95 |
| 2022/0396339 A1* | 12/2022 | Rossignol | G05B 13/028 |
| 2023/0293741 A1* | 9/2023 | Matsui | G02B 6/001 422/24 |
| 2023/0293745 A1* | 9/2023 | Shigoku | A61L 9/20 422/24 |
| 2023/0396878 A1* | 12/2023 | Young | H04N 23/667 |
| 2024/0062538 A1* | 2/2024 | Bahman | G06V 40/10 |
| 2024/0390535 A1* | 11/2024 | Miyake | A61L 2/26 |
| 2024/0397915 A1* | 12/2024 | Wang | G06Q 50/02 |

OTHER PUBLICATIONS

AKVA Aurora SubLED ENG, "Dimable underwater light that gives you a unique combination of blue, green and ultraviolet LED light." https://www.akvagroup.com, Oct. 23, 2019.

Lovik, Arnik, " Biomass Estimation in Aquaculture Facilities," Modeling, Identification and Control (MIC), Jan. 1987, vol. 8, No. 1, 1-10. ResearchGate, https://www.researchgate.net, doi: 10.4173/mic.1987.1.1.

Storr, Krystnell A., "Yes, Fish Get Skin Cancer, Too." Aug. 1, 2012 AAAS https://www.science.org/content/article/yes-fish-get-skin-cancer-too.

UV Systems for Aquaculture, Aquafine, https://www.aquafineuv.com/Aquaculture. Jul. 6, 2020.

* cited by examiner

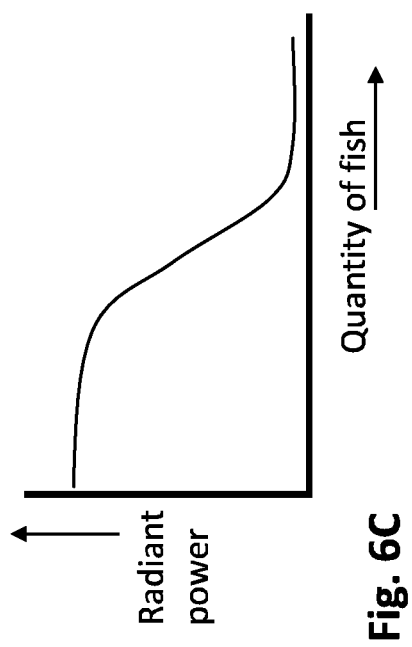
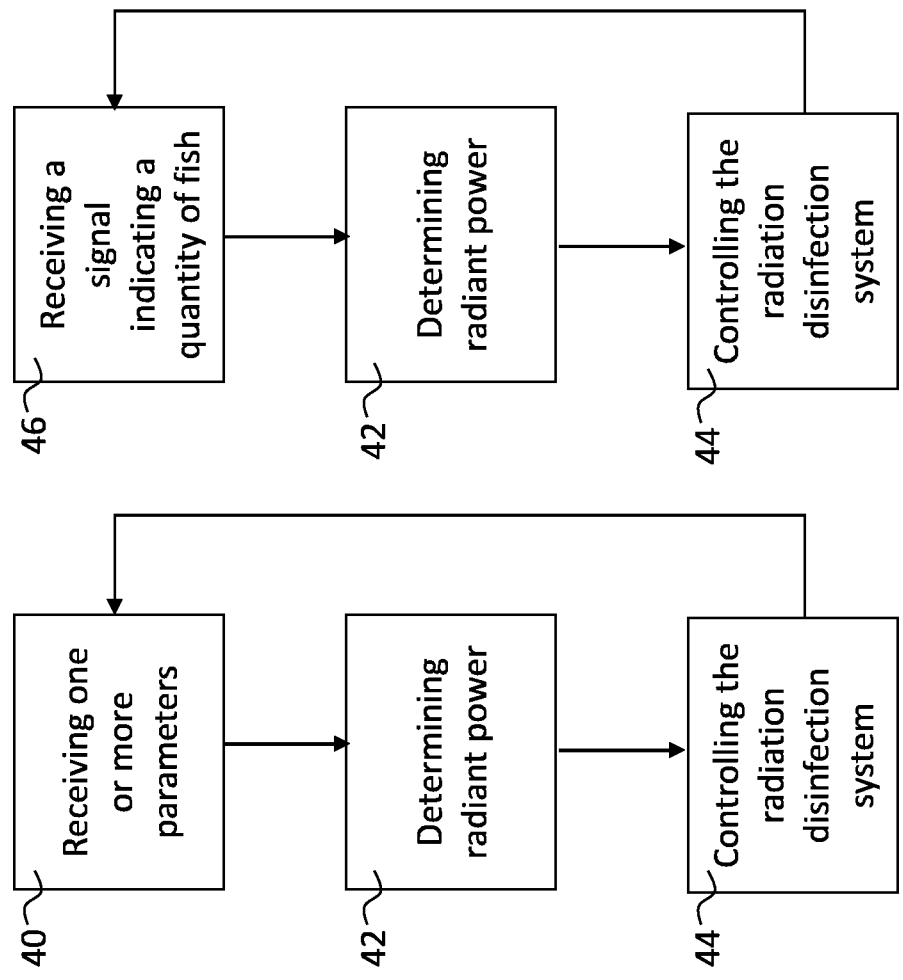
Fig. 6C
Fig. 6B
Fig. 6A

SYSTEM AND METHOD FOR PROTECTING FISH FROM PARASITE INFECTION

CROSS-REFERENCE TO PRIOR APPLICATIONS

This application is the U.S. National Phase application under 35 U.S.C. § 371 of International Application No. PCT/EP2022/051391, filed on Jan. 21, 2022, which claims the benefit of European Patent Application No. 21154028.1, filed on Jan. 28, 2021. These applications are hereby incorporated by reference herein.

FIELD OF THE INVENTION

This disclosure relates to systems for protecting fish from parasite infection. In particular to such systems wherein a radiation disinfection system is configured to provide disinfection radiation to a first region bordering a water surface, and wherein a fish guidance system is configured to deter fish from moving into the first region and/or prompt fish to remain in and/or return to a second region away from the water surface. This disclosure also relates to corresponding methods and to computer programs for execution of such method and to computer-readable storage media having stored such computer programs.

BACKGROUND

Aquaculture is gaining considerable importance in feeding the world in a sustainable manner. An important challenge in fish farms is the presence of parasites, such as sea lice, which attach to the skin of the fishes. Once the fish have been affected, they cannot be commercialized. Chemical agents may be used to remove such parasites. However, such chemical agents significantly lower the quality of the harvest (or prevent the harvest to be sold at all) and/or cause delays/disruptions in the farming.

It has been proven in literature that UV light is capable of disinfecting water from sea lice, by sterilizing their eggs and destroying their larvae. (See *Ultraviolet-C light suppresses reproduction of sea lice but has adverse effects on host salmon*, Barrett et al, Aquaculture 520 (2020) 734954.) However, it is known that UV light has undesired effects on fish, ranging from blinding them to burning their skin, making it at present unusable for disinfecting the fish.

Therefore, there is a need in the art for technology that protects fish from parasite infection.

WO 2018/011745 A1 discloses a method of sorting live fish and comprises guiding fish from a holding area through a recording device and identify features of individual fish characterizing the condition of the fish and individuals. Based on the identified features, a desired action for each individual fish is decided, and each individual fish is subsequently guided to one or more destinations in which the desired action can be performed on the fish. The characterizing condition may be a sea lice infection and the desired action may be a sea lice treatment of the fish.

SUMMARY

To this end, a system is disclosed for protecting fish from parasite infection. The system comprises a fish guidance system for deterring fish from moving into a first region bordering a water surface and/or for prompting fish to remain in and/or return to a second region away from the water surface. The fish guidance system is configured such that fish can move from the second region into the first region so that they can reach the water surface. The system further comprises a radiation disinfection system that is configured to provide disinfection radiation to the first region, the disinfection radiation being configured to disinfect water from parasites.

Also, a method for protecting fish from parasite infection is disclosed. The method comprises deterring fish, using a fish guidance system, from moving into a first region bordering a water surface and/or prompting fish to remain in and/or return to a second region away from the water surface, while allowing fish to move from the second region into the first region so that they can reach the water surface. The method further comprises providing disinfection radiation to the first region, using a radiation disinfection system, the disinfection radiation being configured to disinfect water from parasites.

This system and this method enable to protect fish from parasite infection without, or at least to a lesser extent, injuring the fish. Parasites, such as sea lice, typically live in a region close to the water surface. Unfortunately, fish tend to periodically swim to the water surface in order to feed and/or fill their swimming bladder. The inventors have realized that parasite infection can be significantly reduced by providing disinfection radiation to the region where the parasites are present before they attach to a fish while at the same time deterring fish from this region and, yet, still allowing fish to enter this region for feeding and/or breathing. The system and method ensure that fish approach the water surface through a region that has been disinfected from parasites yet that they spend only a limited amount of time in this region. This allows to properly disinfect the region without injuring the fish to a too great extent with the disinfection radiation.

The to be protected fish may be salmon, such as *Salmo salar* (also referred to as Atlantic salmon), *Oncorhynchus tshawytscha* (also referred to as Chinook salmon), *Oncorhynchus keta* (also referred to as Chum salmon), *Oncorhynchus kisutch* (also referred to as Coho salmon), *Oncorhynchus masou* (also referred to as Masu salmon), *Oncorhynchus gorbuscha* (also referred to as Pink salmon), *Oncorhynchus nerka* (also referred to as Sockeye salmon).

Additionally or alternatively, the fish may be tilapia fish, for example from the Coptodonini and/or Oreochromini tribes. Additionally or alternatively, the fish may be trouts. Herein, trout is used as the common name for a number of species of freshwater fish belonging to the genera *Oncorhynchus*, *Salmo* and *Salvelinus*, all of the subfamily Salmoninae of the family Salmonidae. Additionally or alternatively, the fish may be carp fish. Carp are various species of oily freshwater fish from the family Cyprinidae. Additionally or alternatively, the fish may be cod fish. As user herein, cod may refer to the demersal fish genus *Gadus*, belonging to the family Gadidae.

The fish may be farmed fish. The disclosed technologies are highly suitable for use in fish farms, wherein fish are raised commercially in fish enclosures, such as tanks, sea cages or fish ponds.

The parasites may be sea lice from the family Caligidae (scientific classification), especially from the *Lepeophtheirus* or *Caligus* genera. In a particular example, the fish are salmons and the parasites are *Lepeophtheirus salmonis* (also referred to as salmon lice).

The first region mentioned above will typically be above said second region. The first region is for example an upper region of a fish enclosure, such as an upper region of a sea cage or fish tank. Typically the second region borders the first region and typically the second region does not border the water surface. The first region may comprise a region where the parasites are present before they attach to a fish and the second region may be a region where typically no unattached parasites live.

The fish guidance system may be any system that can drive fish towards and/or away from certain regions in the water. The fish guidance system may be configured to prompt fish to remain in and/or return to the second region so that the fish spend more time in the second region than in the first region. To illustrate, the fish guidance system may be embodied as a feeding system that is configured to provide food in a certain region in the water, for example at a certain depth. The fish food being provided in a certain region will prompt fish to remain in and/or move towards that region. Additionally or alternatively, the fish guidance system may be configured to deter fish from moving into the first region so that the fish remain in and/or return to the second region. To illustrate, the fish guidance system may be embodied as a strobe light system that is configured to illuminate the first region with strobe light herewith scaring the fish away from the first region.

The disinfection radiation may be configured to disinfect water from parasites in that it is configured to destroy the parasites themselves or parts thereof, such as DNA, and/or their larvae and/or sterilize their eggs. In an embodiment, the disinfection radiation is ultraviolet radiation, such as ultraviolet C radiation, that comprises sufficient radiant power to disinfect water from parasites. Ultraviolet radiation may be understood to refer to electromagnetic radiation having a wavelength between 100 and 400 nanometer, approximately, and ultraviolet C radiation may be understood to refer to electromagnetic radiation having a wavelength between 100 and 280 nanometers.

The disinfection radiation may have a wavelength between 100 and 300 nanometers, preferably between 200 and 300 nanometers.

Preferably, the radiation disinfection system is configured such that the second region receives only limited disinfection radiation, preferably such that substantially no disinfection radiation reaches the second region.

The provided disinfection radiation may have a constant radiant power. Alternatively, as explained below, the radiant power of the provided disinfection radiation may vary, for example in dependence of whether fish are detected in the first region or not.

In an embodiment, the fish guidance system is configured to deter fish from moving into the first region using electrical and/or visual and/or acoustic and/or chemical and/or hydrological fish deterrence techniques. In an embodiment of the method, such fish guidance system is used. Such techniques are highly suited for deterring fish while at the same time allowing them to move into the first region in the absence of an impenetrable physical barrier.

In an example, the fish guidance system is configured to deter fish from moving into the first region using, what is called in the art, non-physical barriers. Such non-physical barriers may be formed using electrical and/or visual and/or acoustic and/or chemical and/or hydrological fish deterrence techniques. Examples of such non-physical barriers are described in publication by Noatch and Suski, Environmental Reviews, Vol. 20, page 1-12, 2012, titled "Non-physical barriers to deter fish movements". The contents of this publication is hereby incorporated herein in its entirety.

In an embodiment, the fish guidance system comprises one or more light sources near and/or at a boundary between the first region and second region, the one or more light sources being configured to emit light towards the second region, wherein the light is perceivable for the fish. This embodiment provides a convenient fish guidance system. In an embodiment of the method, such fish guidance system is used.

The light may be pleasing for the fish so that they prefer to stay in the second region where the pleasing light is present. Alternatively, the light may also be configured to repel the fish. Strobe light for example is known to scare fish away. This light can be used to scare fish away from the first region, which also result in the fish remaining in the second region.

The light may be perceivable for the fish in that it is visible by the fish. The light may additionally or alternatively be perceivable for the fish in that fish can sense the light through their head using photoreceptors in the brain and pineal brain as for example described in *Vertebrate ancient (VA) opsin and extraretinal photoreception in the Atlantic salmon (Salmo salar)*, Journal of Experimental Biology 203(Pt 12):1925-36, June 2000.

The light sources may be positioned above the second region and/or in an upper region of the second region. In such case, the light sources are configured to emit light downwards.

Preferably, the light sources are positioned at a depth below the water surface, wherein the depth is between 5 and 11 meters, preferably between 6 and 10 meters, more preferably between 7-9 meters, e.g. approximately 8 meters.

In an embodiment, the radiation disinfection system comprises one or more disinfection radiation sources near and/or at a boundary between the first region and second region, the one or more disinfection radiation sources being configured to emit disinfection radiation towards the first region. In an embodiment of het method, such radiation disinfection system is used.

An advantage of this embodiment is that it enables to direct the disinfection radiation away from the second region. Hence, the second region will receive only limited disinfection radiation, which is typically harmful for the fish.

The one or more disinfection radiation sources may be UV-C disinfection light sources.

The disinfection radiation sources may be positioned below the first region and/or at a bottom part of the first region. In such embodiment the disinfection radiation sources are configured to emit disinfection radiation upwards.

The one or more disinfection radiation sources may be positioned at a depth below the water surface, wherein the depth is between 5 and 11 meters, preferably between 6 and 10 meters, more preferably between 7-9 meters, e.g. approximately 8 meters. Given that the parasites typically live close to the water surface, the deeper the disinfection radiation sources are positioned, the lower their effectiveness in disinfecting the water in the first region.

In an embodiment, the fish guidance system and radiation disinfection system are integrated into a single luminaire. In an embodiment of the method, such a single luminaire is used. Such a single luminaire enables the system for protecting fish from parasite infection to be embodied as a compact system and/or to be installed in already existing luminaire systems. Preferably, the disinfection radiation sources are positioned such on the single luminaire that they emit disinfection radiation in directions having a first direction component, e.g. having an upwards component, and the light sources are positioned on the single luminaire such that they emit light in directions having a second direction component that is substantially opposite the first direction component, e.g. in directions having an upwards direction component.

In an embodiment, the system comprises a control system for controlling the radiation disinfection system. In an embodiment the method comprises controlling the radiation disinfection system for providing the first region with disinfection radiation, preferably using a control system. This conveniently enables automatic control of the radiation disinfection system. The control system may also be configured to control the fish guidance system, for example configured to control one or more light sources of the fish guidance system and/or to control a feeding system comprised in the fish guidance system. In an embodiment, the system further comprises a fish detection system for detecting fish in the first region. In such embodiment, the control system may be configured to receive one or more signals from the fish detection system, the one or more signals indicating a quantity of fish detected in the first region. In such embodiment, the control system may also be configured to control a radiant power of the disinfection radiation emitted by the radiation disinfection system in dependence of said indicated quantity.

In an embodiment, the method comprises receiving one or more signals from a fish detection system configured to detect fish in the first region, the one or more signals indicating a quantity of fish detected in the first region. In this embodiment, the method also comprises controlling a radiant power of the disinfection radiation emitted by the radiation disinfection system in dependence of said indicated quantity.

These embodiments are advantageous in that they aid to improve the disinfection capabilities of the system/method while still preventing fish from being injured by the disinfection radiation. If no fish, or only a small quantity of fish, are present in the first region, then the radiant power of the disinfection radiation may be set at a relatively high level without the risk of injuring (many) fish. Higher levels of radiant power of disinfection radiation is associated with a higher effectiveness with which water is disinfected. Vice versa, if (many) fish are present in the first region, then preferably the radiant power is set at relatively low levels.

As used herein, radiant power may be understood to refer to a radiant energy emitted per unit of time, for example by the disinfection radiation sources of the disinfection radiation system. Radiant power may also be referred to as radiant flux.

The fish detection system may comprise detection cameras that are configured to monitor the first region. Other examples of a fish detection system include systems that are configured to use biomass estimation techniques (some are known in literature), or technologies like sonar/lidar.

Optionally, the fish detection system is configured to detect fish and the second region as well and to output a further signal indicating a quantity of fish detected in the second region. This allows to calculate a fraction of the total fish population, which fraction is present in the first region.

It should be appreciated that if the total quantity of fish in the enclosed area is known, then the fish detection system may be configured to detect fish in the first region by detecting a quantity of fish in the second region and subtracting this detected quantity from the total quantity of fish.

In an embodiment, the control system is configured to determine an appropriate radiant power of the disinfection radiation emitted by the radiation disinfection system based on at least one of the following parameters:

a maximum amount of energy of disinfection radiation per unit of time receivable by fish;

a target amount of energy of emitted disinfection radiation per unit of time;

a transmittance of water in the first region and/or second region for disinfection radiation, a quantity of fish present in the first region, a state of a feeding system configured to provide food for the fish, said state indicating whether or not the feeding system is providing food;

a radiant power of sunlight reaching the first and/or second region, and to control the radiation disinfection system to emit disinfection radiation at said determined appropriate radiant power.

In an embodiment, the method comprises determining an appropriate radiant power of the disinfection radiation emitted by the radiation disinfection system based on at least one of these parameters.

These embodiments enable to determine appropriate levels of radiant power given a variety of circumstances. It should be appreciated that determining the appropriate radiant power is a trade-off between, on one hand, minimizing the risk of fish being injured by disinfection radiation, which can be achieved by minimizing the radiant power of the disinfection radiation emitted by the disinfection radiation system, and, on the other hand, minimizing the risk of fish being infected by parasites, which can be achieved by maximizing the radiant power of the disinfection radiation.

The maximum amount of energy of disinfection radiation per unit of time receivable by fish may refer to a maximum radiant power receivable by fish expressed by a maximum wattage. However, the maximum amount of energy of disinfection radiation per unit of time receivable by fish may for example also refer to a maximum amount of energy receivable by fish per day, per week or per month. The same holds for the target amount of energy of emitted disinfection radiation per unit of time. This may be a target wattage. However, this target amount may also be a target amount of energy per day, for example.

It should be appreciated that the maximum amount of energy of disinfection radiation per unit of time received by fish may depend on the species of the fish in question. One species may better withstand disinfection radiation than others.

Preferably, the control system is configured to determine an appropriate radiant power repeatedly, e.g. periodically, e.g. every second, minute, hour, et cetera. This enables that the radiant power is, at any given time, suitable for the present conditions.

The system for protecting fish from parasite infection may comprise a turbidity sensor that is configured to measure a turbidity of the water in the first and/or second region. The control system may be configured to receive one or more signals from such turbidity sensor, wherein the signals indicate a degree of turbidity in the first and/or second region. The turbidity influences how much radiant power the fish receive through the disinfection radiation, but also through sunlight, and, of course, also how much radiant power effectively reaches parasites in the first region.

The control system may be configured to receive a signal from a feeding system indicating a state of the feeding system.

The system for protecting fish from parasite infection may comprise a light sensor that is configured to measure a radiant power of sunlight reaching the first and/or second region. The radiant power of sunlight may namely contribute to the total harmful radiant power received by fish in the first and/or second region. The control system may be configured to receive one or more signals from the light sensor, wherein the one or more signals indicate a radiant power of sunlight.

In an embodiment, the control system is configured to receive a first signal from the fish detection system, the first signal indicating that a first quantity of fish is present in the first region, and configured to, based on the indicated first quantity, control the radiation disinfection system to provide disinfection radiation to the first region at a first radiant power, and configure to receive a second signal from the fish detection system, the second signal indicating that a second quantity of fish is present in the first region, the second quantity being higher than the first quantity, and configured to, based on the indicated second quantity, control the radiation disinfection system to provide disinfection radiation to the first region radiation at a second radiant power that is lower than the first radiant power.

In an embodiment, the method comprises (i) receiving a first signal from the fish detection system, the first signal indicating that a first quantity of fish is present in the first region, and (ii), based on the indicated first quantity, controlling the radiation disinfection system to provide disinfection radiation to the first region at a first radiant power, and (iii) receiving second signal from the fish detection system, the second signal indicating that a second quantity of fish is present in the first region, the second quantity being higher than the first quantity, and (iv), based on the indicated second quantity, controlling the radiation disinfection system to provide disinfection radiation to the first region radiation at a second radiant power that is lower than the first radiant power.

The second radiant power may be zero. In such case, the disinfection radiation system is thus controlled to refrain from providing disinfection radiation to the first region.

These embodiments enable that the radiant power of the disinfection radiation is automatically adjusted in dependence of how many fish are present in the first region. Preferably, the more fish are present in the first region, the lower the radiant power of the disinfection radiation is set. The more fish are present, namely, the higher the risk of injuring too many fish with the disinfection radiation.

The first signal for example indicates that approximately ten fish are present in the first region, whereas the second signal for example indicates that approximately one hundred fish are present in the first region.

The fish detection system may also be configured to output a binary signal, wherein one value would indicate that no fish are present and another value would indicate that fish are present. The first signal may then indicate a first quantity in that it indicates that no fish are detected. Further, the second signal may then indicate a second quantity in that it indicates that fish are detected (herewith indicating a quantity higher than zero).

As said, the first signal may indicate that no fish are present in the first region. Then, the radiation disinfection system may be controlled to provide disinfection radiation at a first radiant power, which may be constant over time. Then, at some point, fish may swim into the first region. As a result, the fish detection system may provide the second signal to the control system, wherein the second signal indicates that fish are present in the first region. Then, the radiation disinfection system may be controlled such that it does not provide any disinfection radiation. If, thereafter, the fish detection system no longer detects any fish, the radiation disinfection system may be controlled such that it again provides radiation detection to the first region.

In an embodiment, the control system is configured to compare the first quantity with a first threshold quantity and to, based on a determination that the first quantity is lower than the first threshold quantity, control the radiation disinfection system to provide disinfection radiation to the first region at the first radiant power. The control system may further be configured to compare the second quantity with a second threshold quantity and to, based on a determination that the second quantity is higher than the second threshold quantity, control the disinfection radiation system to provide disinfection radiation to the first region at the second radiant power. The first and second threshold are optionally the same threshold.

Controlling the radiation disinfection system to provide disinfection to the first region at a certain radiant power may be performed such that the radiant power is continuously increased or decreased to that certain radiant power. Alternatively, the radiant power may be changed in a discontinuous manner.

Further, controlling the radiation disinfection system to provide disinfection radiation to the first region at a certain radiant power may comprise, during a first time period keeping the radiant power of the disinfection radiation the same and causing a change of the radiant power only after the time period has expired. The latter allows the control system to verify whether the conditions that occasioned the change of radiant power are still present. Hence, this embodiment prevents that the provided radiant power varies only when necessary.

In an embodiment, the control system is configured to determine said radiant power by performing steps of:
  based on at least one of said parameters, determining for a candidate radiant power of disinfection radiation, an expected degree of damage to fish, and
  determining that the expected degree of damage to fish is lower than a threshold degree of damage to fish, and
  based on this determination, determining the candidate radiant power to be said radiant power.

In an embodiment, the method comprises (i) based on at least one of said parameters, determining for a particular radiant power of disinfection radiation, an expected degree of damage to fish, and (ii) determining that the expected degree of damage to fish is lower than a threshold degree of damage to fish, and (iii) based on this determination, controlling the radiation disinfection system to provide disinfection radiation at said particular radiant power.

These embodiments enable to control the system based on an acceptable degree of damage to fish. The threshold degree of damage to fish may for example be input in the control system by a supervisor.

In an embodiment, the control system is configured to determine for a plurality of candidate radiant power values, an associated expected degree of damage and select the highest candidate radiant power value that is still associated with an expected degree of damage that is lower than the threshold damage.

One aspect of this disclosure relates to a fish enclosure system for keeping fish within an area within a sea, fjord, river or lake, wherein the fish enclosure system is provided with a system for protecting fish from parasite infection according to any of the preceding claims, said area comprising the first region and second region.

The fish enclosure system may be embodied as a fish tank or sea cage, for example.

One aspect of this disclosure relates to a computer program comprising instructions which, when the program is executed by a control system as described herein, cause the system for protecting fish from parasite infection described herein, to perform any of the methods for preventing parasite infection described herein.

One aspect of this disclosure relates to a non-transitory computer-readable storage medium having stored thereon a computer program as described herein.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclosure relates to a computer program or suite of computer programs comprising at least one software code portion or a computer program product storing at least one software code portion, the software code portion, when run on a computer system, being configured for executing any of the methods described herein.

One aspect of this disclosure relates to a non-transitory computer-readable storage medium storing at least one software code portion, the software code portion, when executed or processed by a computer, is configured to perform any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems (e.g. to an existing control system as described herein) or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIG. 6 illustrate methods according to an embodiment;

DETAILED DESCRIPTION OF THE DRAWINGS

In the figures, identical reference numbers indicate identical or similar elements.

Figure 1:
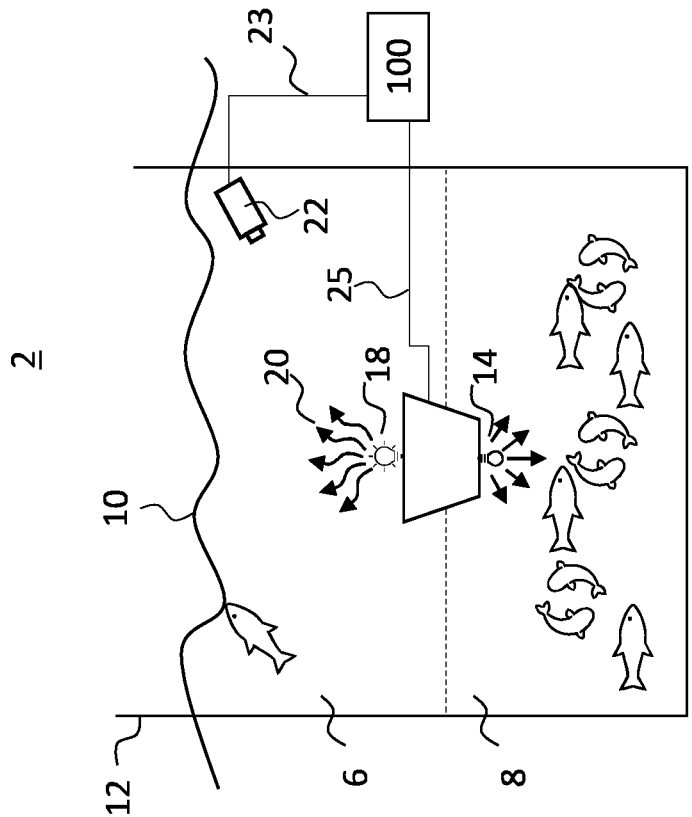
FIG. 1 schematically illustrates a fish enclosure system according to an embodiment comprising a system for protecting fish from parasite infection according to an embodiment.

FIG. 1 schematically illustrates a fish enclosure system 2 for keeping fish within an area within a sea, fjord, river or lake. The fish enclosure system 2 is provided with a system 4 for protecting fish from parasite infection according to an embodiment. Said area comprises a first region 6 and a second region 8. The first region 6 borders water surface 10. Preferably, the fish enclosure system comprises a physical barrier 12 which the fish swim through.

The system 4 comprises a fish guidance system for deterring fish from moving into the first region 6. In the embodiment of FIG. 1, the fish guidance system comprises one or more light sources 14 near and/or at a boundary between the first region 6 and second region 8. In FIG. 1, this boundary is indicated by dashed line 16. It should be appreciated that the boundary may be defined by the fish guidance system. A fish guidance system 14 as referred to in this disclosure may be understood to cause the fish to spend more time in the second region 8 than in the first region 6. Hence, the location of the second region depends on the configuration of the fish guidance system, for example on the position and orientation of the one or more light sources 14. The first region 6 may be defined as a region bordering the second region (and, of course, bordering the water surface 10). The one or more light sources 14 of the fish guidance system are configured to emit light towards the second region 8. This light is perceivable, e.g. visible, for the fish. It is known that fish tend to remain below the light sources 14. Such light sources 14 are for example described in Aquaculture 233(1-4):269-282, April 2004, and in Journal of Fish Biology 58(6):1570-1584, June 2001.

In the depicted embodiment, the fish guidance system may use so-called visual fish deterrence techniques. The light from light sources 14 may namely scare away the fish from the first region 6. Alternatively, the light from the light sources 14 may be pleasant for the fish so that the fish tend to remain below them.

It should be appreciated that fish can move from the second region 8 into the first region 6 so that they can reach the water surface 10. Else, the fish may not be able to breathe.

The embodiment of FIG. 1 also comprises a radiation disinfection system 18 that is configured to provide disinfection radiation 20 to the first region 6. It should be appreciated that not necessarily the entire first region receives the disinfection radiation 20. Most importantly, the region where the parasites live, typically close to water surface 10, preferably receives the disinfection radiation. The disinfection radiation is configured to disinfect water from parasites.

In the embodiment of FIG. 1, the radiation disinfection system 18 comprises one or more disinfection radiation sources near and/or at the boundary between the first and second region. Further the one or more disinfection radiation sources are configured to emit disinfection radiation 20 towards the first region 6.

In the embodiment of FIG. 1, the fish guidance system and radiation disinfection system 18 are integrated into a single luminaire. Preferably, the light emitted by the one or more light sources 14 and the disinfection radiation 20 are emitted in substantially opposite directions. In the embodiment of FIG. 1, the disinfection radiation is emitted upwards, whereas the light from the one or more light sources 14 is emitted downwards.

Figure 2:
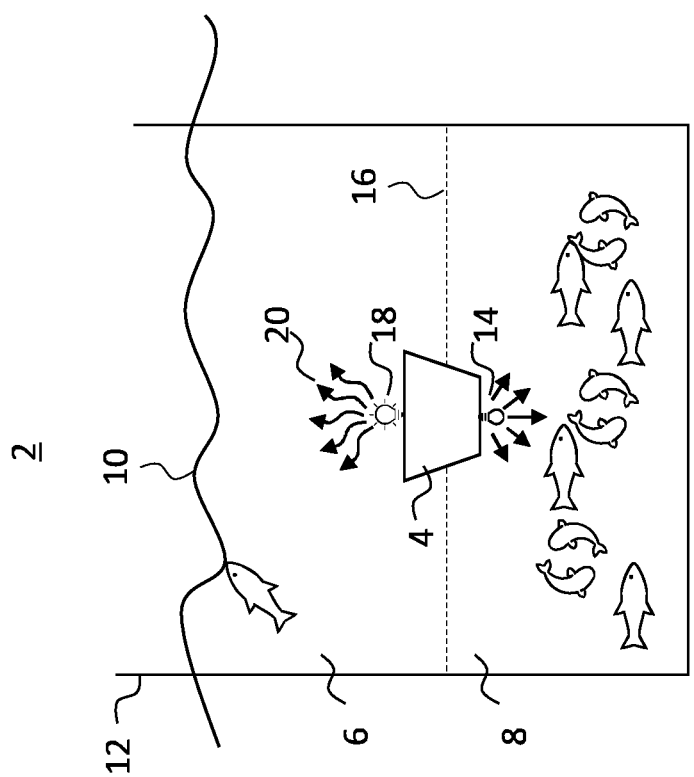
FIG. 2 schematically illustrates an embodiment of the system comprising a control system and a fish detection system.

FIG. 2 schematically shows an embodiment, wherein the system 4 for protecting fish from parasite infection comprises a fish detection system 22 for detecting fish in the first region 6. This embodiment also comprises a control system 100, which is connected to the fish detection system 22, as indicated by the solid line 23. The control system 100 is configured to control the disinfection radiation system 18, in particular the one or more disinfection radiation sources. In a preferred embodiment, the control system is configured to control the radiant power of the disinfection radiation that is emitted by the one or more disinfection radiation sources. The control system 100 is also connected to the disinfection radiation system 18 as indicated by the solid line 25.

It should be appreciated that solid lines, such as solid line 23 and solid line 25, between control system 100 and other systems or sensors may indicate wired or wireless connections. Further, the control system may be integrated in luminaire 4 or in fish detection system 22. The control system may also be a distributed system in that different components, such as different software modules, are present in different systems or sensors.

The fish detection system 22 is configured to detect fish in the first region and preferably outputs a signal that is indicative of a quantity of fish that is being detected in the first region. In a simple example, this is embodied as a fish detection system that outputs a binary signal as explained above. The control system 100 is preferably configured to control the radiant power of the disinfection radiation in dependence of the indicated quantity of fish detected in the first region 6, preferably in the sense that the more fish are present in the first region, the less radiant power is emitted by the radiation disinfection system.

Figure 3:
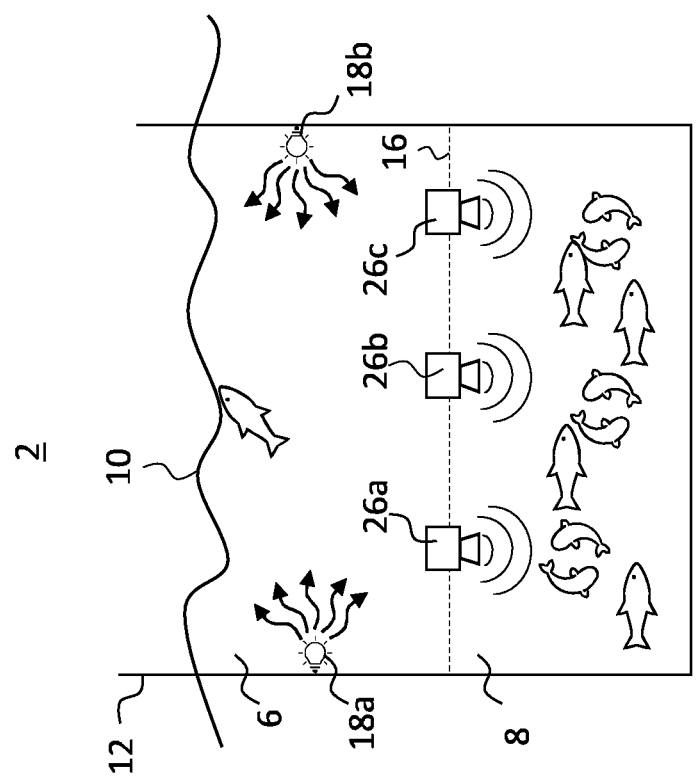
FIG. 3 schematically illustrates an embodiment wherein the system comprises a fish guiding system that comprises sound sources and wherein disinfection radiation sources are positioned on a side barrier of the fish enclosure system.

FIG. 3 shows another embodiment of the system for protecting fish from parasite infection, in particular another embodiment of the fish guidance system and another embodiment of the disinfection radiation system. In this embodiment, the fish guidance system and radiation disinfection are not integrated into a single luminaire, but comprises distributed components. In this embodiment, the fish guidance system comprises one or more sound sources 26a, 26b, 26c that is or are configured to produce a sound signal, wherein the sound signal is configured to scare away fish. Hence, the fish are deterred away from the first region 6. Thus, in this embodiment, the fish guidance system makes use of acoustic fish deterrence techniques.

Further, the embodiment of FIG. 3 illustrates that disinfection radiation sources 18a, 18b, may be positioned on side physical barriers 12 of the fish enclosure system 2, as opposed to on a boundary between first region 6 and second region 8.

Figure 4:
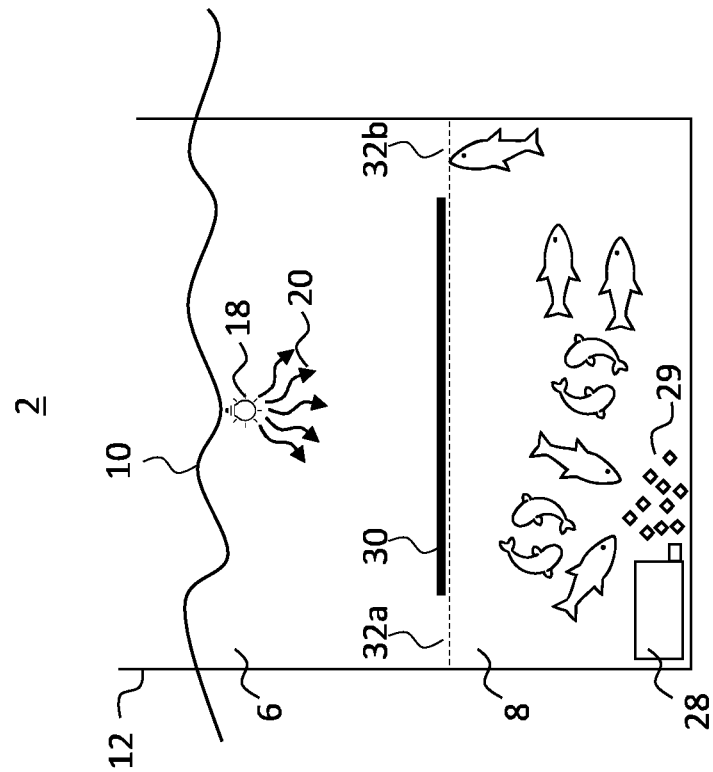
FIG. 4 schematically illustrates an embodiment wherein the fish guiding system comprises a feed system and wherein disinfection radiation sources are positioned near the water surface.

FIG. 4 illustrates another embodiment of the system for protecting fish from parasite infection, in particular another embodiment of the fish guidance system and another embodiment of the disinfection radiation system. In this embodiment, the fish guidance system is embodied as a feed system 28 that is configured to provide fish food 29 in the second region, in an area away from the first region. In this particular example, the feed system 28 is configured to provide food 29 near a bottom of the fish enclosure system 2. Hence, the fish guidance system is configured to prompt fish to remain in and/or return to the second region 8, because that is where they can feed.

Further, in the embodiment of FIG. 4, the disinfection radiation system 18 comprises a radiation source that is positioned near the water surface and that is configured to illuminate downwards. This is advantageous in that the radiation sources are close to the area where the unattached parasites live. Preferably, in such embodiment, in order to prevent that the second region 8 receives too much of the disinfection radiation 20, a screen 30 is positioned near the boundary between first and second region, wherein the screen is configured to reflect and/or absorb the disinfection radiation. Note that the fish can move from the second region into the first region through openings 32a, 32b in said screen 30.

It should be appreciated that although not shown in any of the figures, the disinfection radiation sources may be positioned at the boundary between first and second region and/or on the sides of barrier as shown in FIG. 3 and/or near the water surface as shown in FIG. 4.

Figure 5:
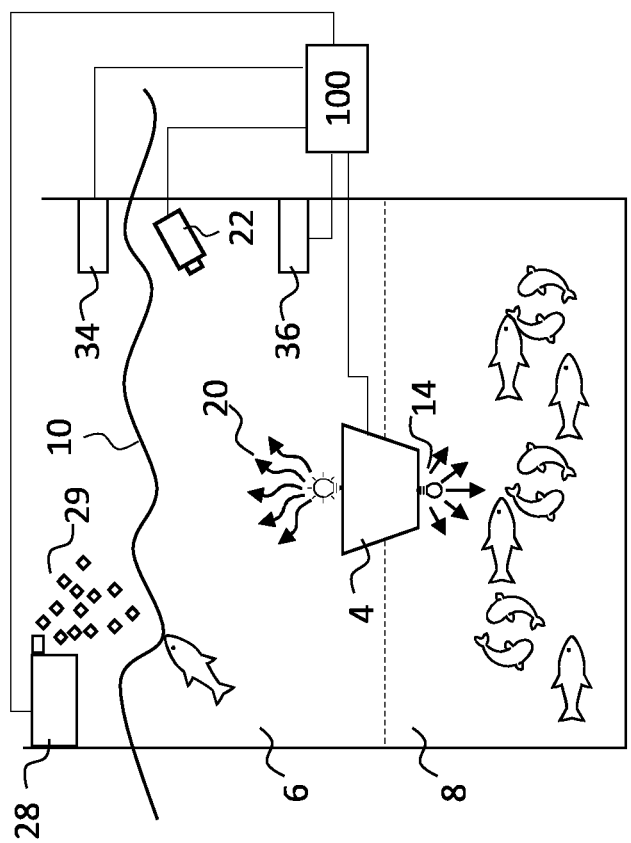
FIG. 5 schematically illustrates an embodiment comprising several sensors.

FIG. 5 illustrates an embodiment of the system for protecting fish from parasite infection. As explained above, the system may be configured to determine a radiant power for the disinfection radiation 20 based on one or more parameters. The system may comprise sensors for measuring these parameters. Preferably, these sensors are connected to the control system 100 that processes measured parameters in the sense that it determines a radiant power based on them.

The embodiment of FIG. 5 comprises a sensor 34 for measuring a radiant power of sunlight reaching the first and/or second region. In particular sensor 34 may be a UV sensor.

Further, the system may comprise a turbidity sensor 36 that is configured to measure a turbidity of the water. The degree of turbidity namely influences to what extent sunlight or disinfection radiation transmits through the water and thus the extent to which fish are exposed to such sunlight or disinfection radiation.

The embodiment of FIG. 5 also comprises a feeding system 28. In this example, the feeding system is configured to provide food at the first region. The feeding system 28 may be connected to the control system 100 so that the control system can control the feedings system and/or so that the feeding system can communicate to the control system 100 whether it is in an ON state (wherein food is being provided to the fish) or an OFF state, wherein no food is being provided to the fish).

It should be appreciated that even if the system for protecting fish from parasites determines a radiant power based on a number of parameters, the system does not necessarily need sensors for measuring these parameters. To illustrate, the amount of UV radiation reaching the first and/or second region may be measured using a sensor 34 as described above. However, the amount of UV radiation may also be determined based on a weather forecast. Similarly, the turbidity of the water may be measured by a sensor, however, the turbidity may also be estimated by an operator and input into control system 100.

FIG. 6A is a flow chart illustrating a method according to an embodiment that may be performed by a control system 100. In an embodiment the control system is configured to determine a radiant power of the disinfection radiation emitted by the radiation disinfection system based on at least one of, e.g. all of, the following parameters:

- a maximum amount of energy of disinfection radiation per unit of time to receivable by fish;
- a target amount of energy of emitted disinfection radiation per unit of time;
- a transmittance of water in the first region and/or second region for disinfection radiation,
- a quantity of fish present in the first region,
- a state of a feeding system configured to provide food for the fish, said state indicating whether or not the feeding system is providing food;
- a radiant power of sunlight reaching the first and/or second region.

Herein, the transmittance of water in the first region and/or second region may depend on the distance below the water surface, i.e. on depth. In principle, the higher the transmittance of water for disinfection radiation, the more fish in the first region are exposed to disinfection radiation given a certain radiant power emitted by the radiation disinfection source. Hence, a higher transmittance, everything else being equal, is associated with a lower appropriate radiant power to be emitted by the radiation disinfection system.

The parameter quantity of fish may indicate an average quantity during some time period. In principle, everything else being equal, a higher quantity of fish is associated with a lower radiant power for the disinfection radiation.

The target amount—a target amount of energy of emitted disinfection radiation per unit of time may be taken into account as well. To illustrate, this target may define a daily target dose of disinfection radiation energy that is provided per day to the first region. If it for example turns out that this target daily dose will not be reached, then the radiation sources may be controlled to emit disinfection radiation at relatively high radiant powers in order to still meet the daily dose.

Further, is the state of the feeding system indicates that the feed system is providing food, then limited or no disinfection is preferably provided to the first region. A feeding schedule can be manually input separately into the control system and into the feeding system. Then, no connection between feed system and control system is required.

In principle, everything else being equal, the higher the radiant power of sunlight reaching the first and/or second region, the lower the appropriate radiant power that is to be emitted by the radiation disinfection system.

In FIG. 6A, in step 40, a selection of these parameters is received, e.g. by the control system. Subsequently, based on the received parameters, a radiant power can be determined. It should be appreciated that the determination of an appropriate radiant power may be a trade-off between two aims, namely the aim of properly disinfecting water in the first region from parasites, which requires a certain minimum amount of disinfection radiation to be provided to the first region and the aim of preventing fish to be damaged by disinfection radiation, which requires that, at least when fish are present in the first region, the radiant power of the disinfection radiation to be relatively low.

After the control system has determined an appropriate radiant power, the control system can control the radiation disinfection system to emit disinfection radiation at said determined radiant power, as illustrated in step 44.

As indicated by the arrow from step 44 to step 40, again one or more parameters may be received by the control system based on which the cycle is repeated. These parameters may be updated parameters. In an example, a sensor repeatedly measures a certain parameter, such a sunlight radiant power or water turbidity, and repeatedly transmit the measured value to the control system. The one or more parameters that are received in a next cycle may also be new parameters that were not taken into account during the first cycle, for example because they had not been measured yet.

FIG. 6B is a flow chart illustrating a particular embodiment of a method for determining a radiant power and subsequently controlling the radiation disinfection system. In the embodiment of FIG. 6B, the radiant power is determined based on a quantity of fish detected in the first region. Of course, other parameters preferably are taken into account as well. However, in a relatively simple embodiment, the radiant power is determined solely based on a quantity of detected fish, for example in the sense that the disinfection radiation system does not emit disinfection radiation when fish are detected in the first region and emits disinfection radiation at a constant radiant power when no fish are detected in the first region.

Preferably, as shown by the arrow pointing from step 44 to step 46, the method is performed repeatedly. To illustrate, in a first cycle, a first signal may be received in step 46, wherein the first signal indicates that a first quantity of fish is present in the first region. Then, in step 42, a first radiant power of disinfection radiation emitted by the radiation disinfection system is determined based on the indicated first quantity. Subsequently, in step 44, the disinfection radiation system controlled accordingly. Then, in a second cycle, in step 46, a second signal is received from the fish detection system, wherein the second signal indicates that a second quantity of fish is present in the first region. The second quantity is higher than the first quantity. Thus it seems that more fish are present in the first region. Then, in step 42, based on the indicated second quantity, a second radiant power of disinfection radiation emitted by the radiation disinfection system is determined, wherein the second radiant power is lower than the first radiant power. In step 44, the radiation disinfection system is controlled to provide disinfection radiation to the first region radiation at said determined second radiant power.

FIG. 6C illustrates a possible dependence between the quantity of fish detected in the first region and a radiant power for the disinfection light, given a certain (fixed) set of circumstances. Clearly, everything else being equal, if more fish are present in the first region, then preferably the radiant power of the disinfection radiation is lower. The radiant power may be said to monotonically decrease with increasing quantity of fish. A function $f(x)$ that is said to be monotonically increasing as used herein may be understood as that the function $f(x)$ is entirely non-decreasing, i.e. that the function in question decreases nowhere for increasing x.

Figures 7A, 7B:
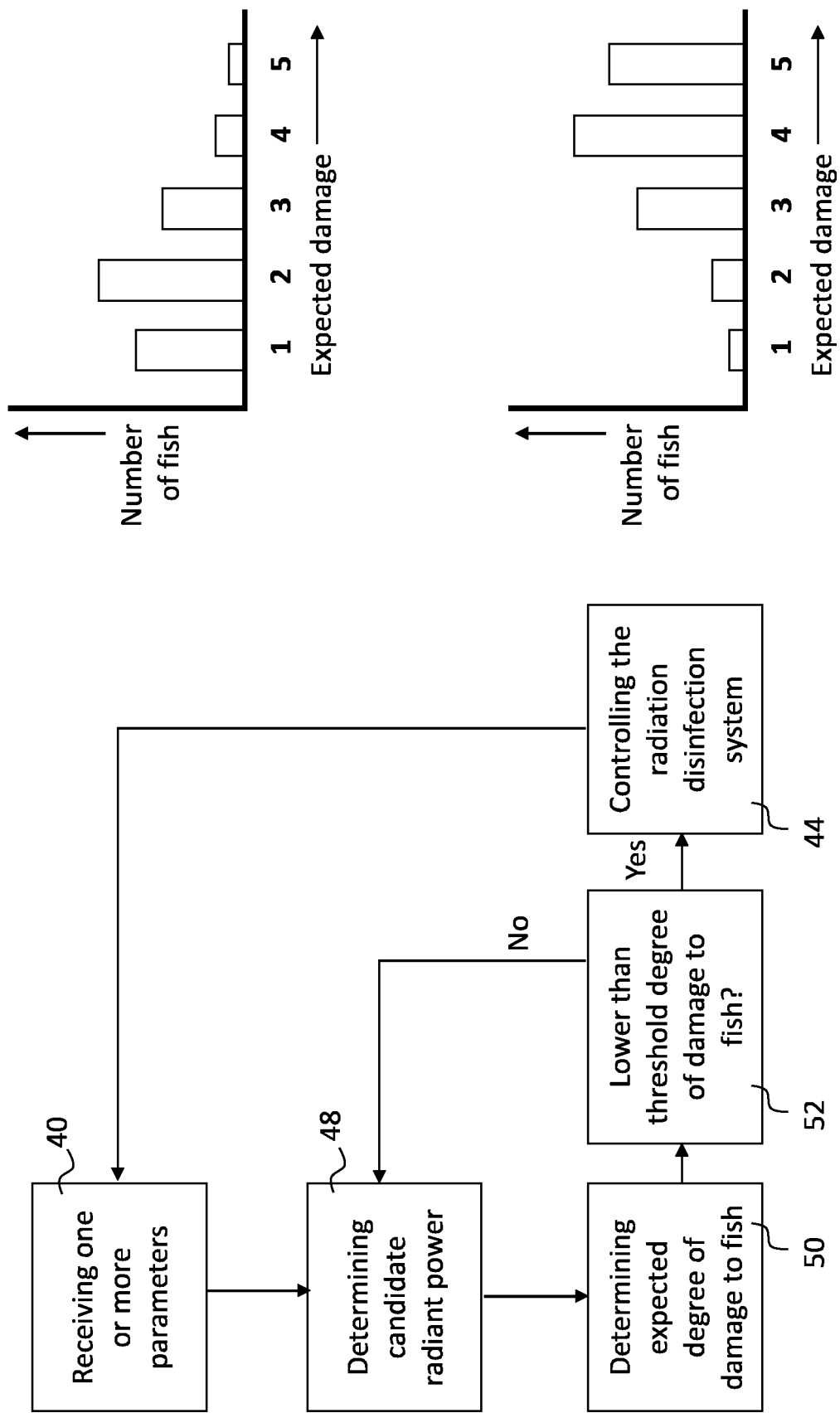
FIG. 7 illustrate a method according to an embodiment wherein a threshold degree of damage is involved.

FIG. 7A is a flow chart illustrating a method for determining a radiant power according to an embodiment. In step 44, one or more parameters are received as described above. Then, a so-called candidate radiant power is determined. This may be performed by a rough estimation of the appropriate radiant power. In an example, a standard value for the candidate radiant power, at least for the first cycle, is used.

Then, in step 50, based on the received parameters in step 40, an expected degree of damage to fish is determined for the candidate radiant power. It should be appreciated that the expected degree of damage to fish may be expressed as a probability that the fish population as a whole in a fish enclosure system is damaged to inacceptable degree. To illustrate, the expected degree of damage may be expressed as a histogram shown in FIG. 7B. Such histogram indicates for the entire fish population how many fish are expected to be injured, and to what extent. The top histogram of FIG. 7B illustrates an expected damage to fish that is relatively low. Most fish will namely have an expected damage score of 3 or lower. In contrast, the bottom histogram of FIG. 7B illustrates an expected damage to fish that is relatively high. The expected damage on the horizontal axis may for example be expressed as the 'skin condition score' or the 'cataract score' that is used in *Ultraviolet-C light suppresses reproduction of sea lice but has adverse effects on host salmon*, Barrett et al, Aquaculture 520 (2020) 734954.

Additionally or alternatively, the expected degree of damage may be expressed as a so-called risk factor, wherein a higher risk factor corresponds to a higher expected degree of damage. Considering $\alpha$, $\beta$, $\gamma$, generic weights, the risk factor at any given time t can be calculated as Risk(depth) = $\alpha *$ NumberOfFish(depth) +

$$\beta * \frac{RadiantPower_{At\,Source\,level}}{Damping1(depth)} + \gamma * \frac{Daylight\ UV_{At\,Surface}}{Damping2(depth)}$$

The dependency on depth can be dropped by either averaging or integrating the risk over the depth. This would result in an overall risk factor.

In this formula, Risk(depth) represents the probability that the fish population (as a whole) is significantly damaged at a certain depth. Given that light penetration (dampening) follows a certain curve depending on the depth, each depth is subject to a different radiation level, hence the fishes at that depth are more or less at risk. The significance of the damage can be tuned based on the factors $\alpha$, $\beta$, $\gamma$. For example, a farmer may consider the population damaged when 30% of fishes have been exposed at a certain radiation level.

NumberOfFish(depth) represents number of fishes at a certain depth.

RadiantPowerAtSourcelevel represents the radiant power emitted by the disinfection radiation system.

Damping1(depth) represents the radiant power loss due to damping for a certain depth due to disinfection radiation travelling from the disinfection radiation source to said certain depth.

Damping2(depth) represents the radiant power loss due to damping for a certain depth due to UV sunlight radiation travelling from the water surface to said certain depth.

Continuing with the flow chart of FIG. 7A, in step 52, the expected degree of damage is compared to a threshold degree of damage. If the expected damage is lower than a threshold, then step 44 may be performed, in which case the candidate radiant power is determined to be the radiant power that the disinfection radiation system should emit. Hence, in step 44, the radiation disinfection system is controlled accordingly. Subsequently the cycle continues indicated by the arrow between step 44 and step 40. Preferably, the method is performed continuously so that it is very response to changes in the circumstances.

The expected degree of damage to fish is for example determined based on a radiant power of sunlight reaching the first and/or second region. Sunlight has a UV component (mainly UV-A and UV-B) that can penetrate water. While this component is not harmful by itself, it can make a difference if its contribution is combined with the disinfection radiation, which may be artificial UV lighting. The UV contribution from the sunlight can be calculated as the damping from the surface. Multiple sensors measurements can be cross-correlated to have the full area mapped.

Additionally or alternatively, the expected degree of damage is determined based on a transmittance of water in the first region and/r second region for disinfection radiation. Penetration of the disinfection radiation in water changes based on the water properties. The penetration factor, also referred to as transmission, can be determined using a factor constant over time, based on the water characteristics for a certain location (for example, UV penetrates deeper in open ocean than in arctic oceans, and least in coastal waters), and based on a turbidity of the water. The above-mentioned contribution of the daylight and of the disinfection radiation, the penetration factor may be used. The penetration factor that depends on the local water characteristics can be estimated and configured during design/installation of the system. The turbidity can be measured using at least one turbidity sensor to estimate the water condition during operation However, if in step 52, the expected degree of damage is higher than a threshold degree of damage, a new candidate radiant power is determined. Preferably, this new candidate radiant power is lower than the previous radiant power, so that the expected damage is decreased.

In a preferred embodiment, the initial candidate radiant power is selected relatively high. Then, in subsequent cycles of steps 48, 50, 52, the highest radiant power can found that is associated with an expected degree of damage that is lower than the threshold degree of damage. In this preferred embodiment, in each cycle, in step 48 a lower candidate power is selected than in the previous cycle.

Of course, FIG. 7a is a relatively simple example of how an appropriate radiant power can be determined. However, in another embodiment, determining a radiant power based on a set of parameter values comprises finding a correlation, e.g. using a machine learning algorithm, between the parameters and the appropriate radiant power. This would enable to determine the appropriate radiant power directly given any set of values for the involved parameters.

It should be appreciated that in light of the histograms shown in FIG. 7B, the threshold degree of damage may not be a simple value, yet may define one or more conditions that the expected degree of damage should meet for it to be regarded as 'lower than the threshold'. Such conditions are for example:

Less than xx % of the fish population has an expected damage of 5;

Less than yy % of the fish population has an expected damage of 4 or higher;

Less than zz % of the fish population has an expected damage of 3 or higher.

Only when an expected degree of damage would for example meet all these conditions, would it be determined as being lower than the threshold damage.

In a specific example, the expected degree of damage would be determined as being lower than the threshold damage if the following three conditions are met:

Less than 90% of the fish population has an expected damage of 5;

Less than 70% of the fish population has an expected damage of 4 or higher;

Less than 50% of the fish population has an expected damage of 3 or higher.

Figure 8:
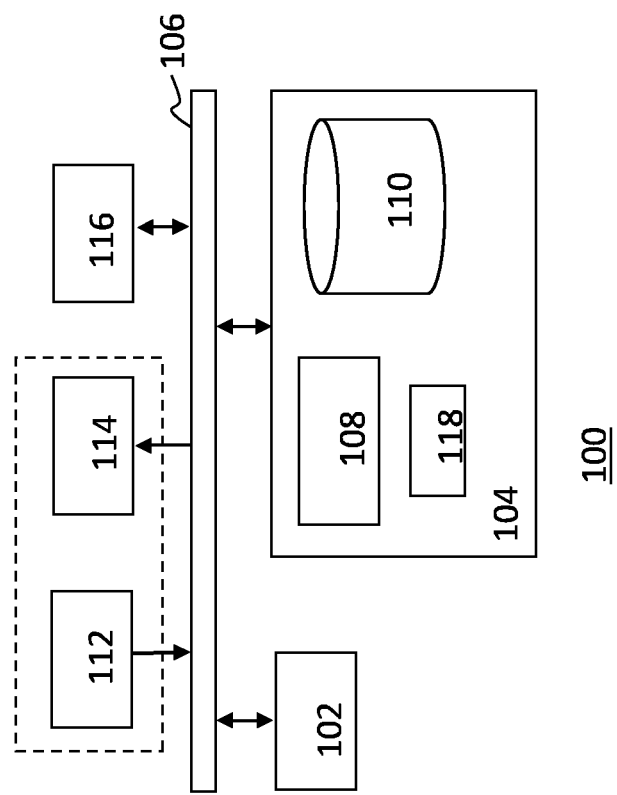
FIG. 8 schematically illustrates a control system according to an embodiment.

FIG. 8 depicts a block diagram illustrating a control system according to an embodiment.

As shown in FIG. 8, the control system 100 may include at least one processor 102 coupled to memory elements 104 through a system bus 106. As such, the control system may store program code within memory elements 104. Further, the processor 102 may execute the program code accessed from the memory elements 104 via a system bus 106. In one aspect, the control system may be implemented as a computer that is suitable for storing and/or executing program code. It should be appreciated, however, that the control system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the control system. Examples of input devices may include, but are not limited to, a keyboard, a pointing device such as a mouse, a touch-sensitive display, or the like. Examples of output devices may include, but are not limited to, a monitor or a display, speakers, or the like. Input and/or output devices may be coupled to the control system either directly or through intervening I/O controllers.

In an embodiment, the input and the output devices may be implemented as a combined input/output device (illustrated in FIG. 8 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the control system to enable it to become coupled to other systems, computer systems, remote network devices, and/or remote storage devices through intervening private or public networks. The network adapter may comprise a data receiver for receiving data that is transmitted by said systems, devices and/or networks to the control system 100, and a data transmitter for transmitting data from the control system 100 to said systems, devices and/or networks. Modems, cable modems, and Ethernet cards are examples of different types of network adapter that may be used with the control system 100.

As pictured in FIG. 8, the memory elements 104 may store an application 118. In various embodiments, the application 118 may be stored in the local memory 108, the one or more bulk storage devices 110, or apart from the local memory and the bulk storage devices. It should be appreciated that the control system 100 may further execute an operating system (not shown in FIG. 8) that can facilitate execution of the application 118. The application 118, being implemented in the form of executable program code, can be executed by the control system 100, e.g., by the processor 102. Responsive to executing the application, the control system 100 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for protecting fish from parasite infection by disinfecting water from parasites, the system comprising:
a fish guidance system for deterring fish from moving into a first region bordering a water surface and/or for prompting fish to remain in and/or return to a second region away from the water surface, whereas the fish guidance system is configured such that fish can move from the second region into the first region so that they can reach the water surface; and
a radiation disinfection system that is configured to provide disinfection radiation to the first region while the fish are within the second region, the disinfection radiation being ultraviolet radiation configured to disinfect water from parasites,
wherein the fish guidance system comprises one or more light sources configured to emit light only toward the second region and the radiation disinfection system comprises one or more disinfection radiation sources configured to emit disinfection radiation only toward the first region.

2. The system according to claim 1, wherein the fish guidance system is configured to deter fish from moving into the first region using electrical and/or visual and/or acoustic and/or chemical and/or hydrological fish deterrence techniques.

3. The system according to claim 1, wherein the one or more light sources are near and/or at a boundary between the first region and second region, wherein the light is perceivable for the fish.

4. The system according to claim 1, wherein the one or more disinfection radiation sources are near and/or at a boundary between the first region and second region.

5. The system according to claim 1, wherein the fish guidance system and radiation disinfection system are integrated into a single luminaire.

6. The system of claim 1, wherein one or more of the one or more disinfection radiation sources are positioned such that they emit disinfection radiation in directions having a first direction component and one or more of the one or more light sources are positioned such that they emit light in directions having a second direction component that is substantially opposite the first direction component.

7. The system according to claim 1, further comprising a control system for controlling the radiation disinfection system.

8. The system according to claim 7, further comprising:
a fish detection system for detecting fish in the first region, wherein the control system is configured to:
receive one or more signals from the fish detection system, the one or more signals indicating a quantity of fish detected in the first region, and to
control a radiant power of the disinfection radiation emitted by the radiation disinfection system in dependence of said indicated quantity.

9. The system according to claim 7, wherein the control system is configured to determine a radiant power of the disinfection radiation emitted by the radiation disinfection system based on at least one of the following parameters:
a maximum amount of energy of disinfection radiation per unit of time receivable by fish;
a target amount of energy of emitted disinfection radiation per unit of time;
a transmittance of water in the first region and/or second region for disinfection radiation,
a quantity of fish present in the first region,
a state of a feeding system configured to provide food for the fish, said state indicating whether or not the feeding system is providing food;
a radiant power of sunlight reaching the first and/or second region, and to control the radiation disinfection system to emit disinfection radiation at said determined radiant power.

10. The system according to claim 9, wherein the control system is configured to determine said radiant power by performing steps of:
based on at least one of said parameters, determining for a candidate radiant power of disinfection radiation, an expected degree of damage to fish, and
determining that the expected degree of damage to fish is lower than a threshold degree of damage to fish, and
based on this determination, determining the candidate radiant power to be said radiant power.

11. A fish enclosure system for keeping fish within an area within a sea, fjord, river or lake, wherein the fish enclosure system is provided with a system for protecting fish from parasite infection according to claim 1, said area comprising the first region and second region.

12. A method for protecting fish from parasite infection by disinfecting water from parasites, the method comprising:
deterring, using one or more light sources, fish from moving into a first region bordering a water surface and/or prompting fish to remain in and/or return to a second region away from the water surface, while allowing fish to move from the second region into the first region so that they can reach the water surface, and
providing, using one or more disinfection radiation sources, disinfection radiation to the first region while the fish are within the second region, using a radiation disinfection system, the disinfection radiation being ultraviolet radiation configured to disinfect water from parasites
wherein the one or more disinfection radiation sources are configured to emit disinfection radiation only toward the first region and the one or more light sources are configured to emit light only toward the second region.

13. The method according to claim 12, comprising controlling the radiation disinfection system for providing the first region with disinfection radiation.

14. A non-transitory computer readable medium comprising instructions which, when the instructions are executed by a control system, cause the control system according to perform the method according to claim 12.

* * * * *